Patented Sept. 17, 1929

1,728,352

UNITED STATES PATENT OFFICE

SHERWIN P. LOWE, OF DENVER, COLORADO, ASSIGNOR TO R. H. CHANNING, AGENT, OF DENVER, COLORADO

FLOTATION CONCENTRATION

No Drawing.   Application filed March 26, 1928.   Serial No. 264,963.

My invention relates to the concentration of mineral values in ores by oil flotation and has particularly in view the separation of an ore containing sulphides of copper, zinc and iron into a copper concentrate, a zinc concentrate and a tailing carrying most of the iron. In the concentration of ores of this type, it is well known that the separation is materially assisted by having the pulp in an alkaline condition due to the presence of lime which is added in preparing ore for flotation.

My improvement consists in the discovery that a much better separation can be made if a careful control is maintained of the alkalinity of the pulp, due to the amount of lime, at different stages of the process.

For instance, while the copper concentrate is being removed the pulp should be just alkaline, but after removing the copper concentrate it is easier to obtain high grade zinc concentrate and a good extraction of zinc by increasing the alkalinity. If the zinc concentrates thus produced are to be retreated a still further increase of alkalinity before retreatment, aids materially in obtaining the best results.

The following examples will show the effect of various conditions when treating sulphide ore assaying as follows:

Cu 1.89%, Zn 4.6%, Fe 34%

The ore is first ground with lime and water, then placed in a flotation machine, pine oil added, then agitated, and copper froth removed. When the alkalinity of the pulp in the copper flotation cells was less than .01 lbs. CaO per ton of water

|  | % Cu | % Zn | % Fe |
|---|---|---|---|
| the concentrates assayed | 5.0 | 4.2 | 32.3 |
| the tailings assayed | .4 | 4.7 | 34.5 |

When the alkalinity of the pulp in the copper flotation cells was .03 lbs. CaO per ton of water

|  | % Cu | % Zn | %·Fe |
|---|---|---|---|
| the concentrates assayed | 12.0 | 4.5 | 29.0 |
| the tailings assayed | .2 | 4.7 | 34.8 |

When the alkalinity of the pulp in the copper flotation cells was .20 lbs. CaO per ton of water

|  | % Cu | % Zn | % Fe |
|---|---|---|---|
| the concentrates assayed | 10.5 | 11.0 | 28.0 |
| the tailings assayed | .25 | 4.1 | 35.0 |

The tailings from the above tests were then floated for the recovery of zinc after the addition of further lime and 1 lb. per ton of ore of copper sulphate.

When the alkalinity of the pulp in the zinc rougher flotation cells was under .4 i. e. .3 lbs. CaO per ton of water

|  | % Cu | % Zn | % Fe |
|---|---|---|---|
| the concentrates assayed | .4 | 15.0 | 28.0 |
| the tailings assayed | .2 | .9 | 34.0 |

When the alkalinity of the pulp in the zinc rougher flotation cells was 6 lbs. CaO per ton of water

|  | % Cu | % Zn | % Fe |
|---|---|---|---|
| the concentrates assayed | .8 | 30.0 | 20.0 |
| the tailings assayed | .2 | .5 | 36.0 |

When the alkalinity of the pulp in the zinc rougher flotation cells was over .7 lbs. CaO i. e. 1.0 lbs. CaO per ton of water

|  | % Cu | % Zn | % Fe |
|---|---|---|---|
| the concentrates assayed | .7 | 22.0 | 24.0 |
| the tailings assayed | .2 | .6 | 35.0 |

The concentrates from the zinc rougher flotation cells, when the pulp contained .6 lbs. CaO per ton of water was refloated, with the addition of enough lime to bring the alkalinity to .8 lbs. CaO per ton of water with the result, that the final concentrates assayed

| % Cu | % Zn | % Fe |
|---|---|---|
| 1.0 | 46.2 | 10.0 |

The concentrates from the zinc rougher flotation cells when the pulp contained either .3 lbs. or 1.0 lbs. CaO per ton of water, could not be retreated to produce higher than a 42% zinc concentrate.

What I claim, is:

1. A method of separating by flotation, ore containing copper, zinc and iron sulphides into a copper concentrate, a zinc concentrate and a tailing carrying a large percentage of the iron sulphides, in which the pulp during the copper flotation is maintained at an alkalinity of from substantially .01 lbs. CaO to .15 lbs. CaO per tone of water and during the zinc flotation the pulp is maintained at an alkalinity of from substantially .4 lbs. CaO to .7 lbs. CaO per ton of water.

2. A method of separating by flotation, ore containing copper, zinc and iron sulphides into a copper concentrate, a zinc concentrate and a tailing carrying a large percentage of iron sulphides in which the pulp during the copper flotation is maintained at an alkalinity of from .01 lbs. CaO to .15 lbs. CaO per ton of water and during the zinc flotation the pulp is maintained at an alkalinity of from .4 lbs. CaO to .7 lbs. CaO per ton of water, and during the retreatment of the zinc concentrates the pulp is maintained at an alkalinity of from .8 to 1.10 lbs. CaO per ton of water.

In testimony whereof, I affix my signature.

SHERWIN P. LOWE.